US012719669B2

(12) United States Patent
Mishra et al.

(10) Patent No.: US 12,719,669 B2
(45) Date of Patent: Aug. 25, 2026

(54) 5G KEY GENERATION / ECC KEY GENERATION AND SUCI CALCULATION

(71) Applicant: Giesecke+Devrient Mobile Security Germany GmbH, Munich (DE)

(72) Inventors: Santosh Kumar Mishra, Pune (IN); Ankit Pandey, Pune (IN)

(73) Assignee: Giesecke+Devrient Mobile Security Germany GmbH, Munich (DE)

( * ) Notice: Subject to any disclaimer, the term of this patent is extended or adjusted under 35 U.S.C. 154(b) by 105 days.

(21) Appl. No.: 18/804,404

(22) Filed: Aug. 14, 2024

(65) Prior Publication Data

US 2025/0070965 A1 Feb. 27, 2025

(30) Foreign Application Priority Data

Aug. 22, 2023 (IN) ............................ 202311056240

(51) Int. Cl.
*H04L 29/06* (2006.01)
*H04L 9/08* (2006.01)
*H04L 9/30* (2006.01)
*H04W 12/02* (2009.01)

(52) U.S. Cl.
CPC .......... *H04L 9/0861* (2013.01); *H04L 9/3073* (2013.01); *H04W 12/02* (2013.01)

(58) Field of Classification Search
None
See application file for complete search history.

(56) References Cited

U.S. PATENT DOCUMENTS

2014/0287685 A1* 9/2014 Griffin ................ H04L 63/0272 455/41.2
2024/0348427 A1 10/2024 Dirnberger

FOREIGN PATENT DOCUMENTS

| | | | | |
|---|---|---|---|---|
| CN | 115103358 A | 9/2022 | | |
| EP | 4071642 A1 * | 10/2022 | ........ H04W 12/0431 | |
| WO | WO-2019068731 A1 * | 4/2019 | ............ H04W 12/06 | |
| WO | 2020179665 A1 | 9/2020 | | |

(Continued)

OTHER PUBLICATIONS

3GPP 31.102, V17.5.0, Universal Mobile Telecommunications System (UMTS); LTE; 5G; Characteristics of the Universal Subscriber Identity Module (USIM) application, As Early As Apr. 1, 2022.

(Continued)

*Primary Examiner* — Andrew J Steinle
(74) *Attorney, Agent, or Firm* — Workman Nydegger

(57) ABSTRACT

A method is for generating, in a UICC, a 5G subscriber concealed identifier, SUCI, for a 5G mobile communication network. The method includes the steps executed in a processing entity comprised in the UICC: (1) generation of a public/private key pair or an ECC public/private key pair; (2) DH or ECDH derivation of an Ephemeral shared key from the generated or ECC public/private key pair; (3) derivation of a symmetric encryption key from the Ephemeral shared key; (4) concealment of at least a part of a subscriber permanent identifier, SUPI, with the generated symmetric key to compute the SUCI. Steps (1, 2) are triggered by a deterministic event at the UICC, and storing the generated or ECC public/private key pair and Ephemeral shared key to a key memory provided in the UICC; and subsequently steps (3, 4) are triggered by receipt of a GET IDENTITY command.

10 Claims, 1 Drawing Sheet

Figure C.3.2-1: Encryption based on ECIES at UE ( [2] 3GPP 33.501, V17.5.0 )

(56) References Cited

FOREIGN PATENT DOCUMENTS

| | | | |
|---|---|---|---|
| WO | 2023016669 | A1 | 2/2023 |
| WO | 2023025411 | A1 | 3/2023 |

OTHER PUBLICATIONS

3GPP 33.501, V17.5.0, "5G; Security architecture and procedures for 5G System", As Early As May 1, 2022.
3GPP 23.003 V16.3.0, Digital cellular telecommunications system (Phase 2+) (GSM); Universal Mobile Telecommunications System (UMTS); LTE; 5G; Numbering, addressing and identification, As Early As Oct. 1, 2020.
Extended European Search Report from corresponding EP Application No. 24195852.9, Jan. 7, 2025.
"3rd Generation Partnership Project; Technical Specification Group Services and System Aspects; Security architecture and procedures for 5G system (Release 17)", 3GPP Draft; 33501-H50, 3rd Generation Partnership Project (3GPP), No. 20220301, Mar. 22, 2022.

* cited by examiner

Figure C.3.2-1: Encryption based on ECIES at UE ( [2] 3GPP 33.501, V17.5.0 )

( [5] 3GPP 23.003 V16.3.0 )

( [5] 3GPP 23.003 V16.3.0 )

5G KEY GENERATION / ECC KEY GENERATION AND SUCI CALCULATION

FIELD OF THE INVENTION

The present invention relates to 5G key generation or ECC key generation and SUCI calculation in a UICC, particularly with services 124 and/or 125 available in the UICC.

BACKGROUND OF THE INVENTION AND PRIOR ART

Mobile communication implies the communication of a Mobile Equipment ME (or User equipment, UE), hosting a UICC, in a mobile communication network. Mobile Equipments ME are known in the form of for example Smartphones, Tablets, M2M devices and IoT devices. UICCs are known in the form of for example plug-in UICCs (also referred to as SIM cards), embedded UICCs (also referred to as eUICCs) and integrated UICCs (also referred to as iUICCs).

In communication in a 5G mobile communication network, a command GET IDENTITY sent from a mobile entity ME to a UICC triggers in the UICC calculation of a subscriber concealed identifier, SUCI. Part of the SUCI generation is the generation of an ECC (Elliptic Curve Cryptography) public/private key pair, followed by a ECDH (Elliptic Curve Diffie Hellman) derivation of an Ephemeral shared key, followed by generation of a symmetric key, and encryption of a part of a subscriber permanent identifier, SUPI (SUPI corresponding analogously to the IMSI of 4G and earlier networks) with the symmetric key, so as to create the SUCI, with the encrypted MSIN being part of the SUCI. The concealed identifier SUCI is used for secured network authentication procedures, in advantage to a plaintext identifier IMSI used in 4G and previous networks. In addition, when the symmetric key is generated, an initial counter block, ICB, is generated, a Message Authentication Code, MAC, key is generated, and a MAC function with the MAC key is applied to calculate a MAC value to enable authentication.

According to specification [1] 3GPP 31.102, V17.5.0, 2022-04, "*Universal Mobile Telecommunications System* (*UMTS*); *LTE;* 5*G; Characteristics of the Universal Subscriber Identity Module* (*USIM*) *application* (*=ETSI TS* 131.102), chapter 4.2.8, functionalities of the UICC are achieved by services available of the UICC, wherein Service 124 is a service to achieve Subscription identifier privacy support, and Service 125 is a service to achieve SUCI calculation by the USIM. Service 124 and 125, if available, are available in the file EF_UST of the UICC.

Instead of by the GET IDENTITY command, the generation of the ECC public/private key pair and ECDH (Elliptic Curve Diffie Hellman) Ephemeral Shared key generation can alternatively be triggered by receipt of an APDU command like STATUS at the UICC.

In Detail, the specification [1] 3GPP 31.102, section 5.3.48, describes SUCI Calculation by the USIM procedure. Specification [2] 3*GPP* 33.501*, V*17.5.0, 2022-05, "5*G; Security architecture and procedures for* 5*G System*" (*=ETSI TS* 133.501), Annex C.3.2, describes the ECIES key scheme, which comprises following steps: key generation including (1) generation of ECC public/private key pair and (2) ECDH derivation of an Ephemeral shared key; (3) derivation of a symmetric encryption key from the Ephemeral shared key, and generation of ICB and MAC key; (4) concealment of the SUPI with the generated symmetric key and the ICB to compute the SUCI, and (5) MAC calculation.

The processing time for ECC key pair generation and ECDH Ephemeral key derivation is considerable, and for hardware chips with only moderate performance it can be a challenge not easily fulfillable to meet the requirement to output the readily calculated SUCI within a preset timeframe after the UICC receives the GET IDENTITY command. In case the UICC exceeds, for output of the calculated SUCI back to the Mobile Equipment, the preset timeframe after the GET IDENTITY command, the procedure is terminated with a failure.

Generally, instead of ECC public/private key pairs and ECDH key derivation, public/private key pairs and Diffie Hellman, DH, key derivation are known, which are not based on Elliptic Curve Cryptography, ECC, as compared to ECC public/private key pairs and ECDH key derivation, which are based on Elliptic Curve Cryptography, ECC.

According to specification [5] 3GPP 23.003 V16.3.0 (2020-10) (=ETSI TS 123.003), several types of SUPI are defined, and dependent on the value of the SUPI type, the SUPI can be an IMSI or a Network Access Identifier, NAI. For generating the concealed identifier SUCI, part of the SUPI is encrypted and used as part of the SUCI. If the SUPI type is IMSI, the MSIN is encrypted. If the SUPI type is NAI, the user name is encrypted.

The document [3] WO2023016669A1 from the prior art discloses a method for calculation of a subscriber concealed identifier, SUCI, in a UICC, triggered by receipt of a GET IDENTITY command at the UICC. The symmetric key used for encrypting the SUPI to SUCI was generated in the UICC already before receipt of the GET IDENTITY command. The symmetric key can particularly be derived by the ECIES key scheme before receipt of the GET IDENTITY command. The generation of the symmetric key already before receipt of the Get IDENTITY command effects a reduced time span required for SUCI calculation once the GET IDENTITY command is received at the UICC.

Document [4] WO2019068731A1 discloses pre-calculation of a SUCI in a UICC and storage of the pre-generated SUCI in the UICC. Due to the pre-calculation of the SUCI, upon receipt of a GET IDENTITY command at the UICC, the SUCI need not be calculated, however only called up from memory.

It would be desired to have a method for SUCI generation which has a reduced time span required for SUCI generation upon receipt of a GET IDENTITY command at the UICC, and which is applicable in a variety of use cases and occasions, and in a controllable manner.

Objective of the Invention

It is an object of the present invention to provide a method for SUCI generation which has a reduced time span required for SUCI generation upon receipt of a GET IDENTITY command at the UICC, and which is applicable in a variety of use cases and occasions, and in a controllable manner.

SUMMARY OF THE INVENTION

The object of the invention is achieved by a method with following features, according to claim 1. Embodiments of the invention are presented in dependent claims.

In greater detail, the object of the invention is achieved by a method for generating, in a UICC, a 5G subscriber concealed identifier, SUCI, wherein upon receipt of a GET IDENTIY command at the UICC, concealment of a subscriber permanent identifier, SUPI, by encryption of at least part of the SUPI with a symmetric key to compute part of the SUCI is performed. The method is characterized by the feature combination that generation of an ECC public/private key pair, and ECDH derivation of said Ephemeral shared key is triggered by the occurrence of a deterministic event at the UICC, and not directly by receipt of the GET IDENTITY command. In addition, derivation of the symmetric encryption key and SUCI calculation with said symmetric encryption key are performed subsequent to the deterministic event and subsequent to the generation of the an ECC public/private key pair and ECDH derivation of said Ephemeral shared key triggered by said deterministic event. Thus, after the UICC receives the GET IDENTITY command, no time for ECC public/private key pair, and ECDH derivation of said Ephemeral shared key is required to be spent. Instead the ECC public/private key pair and Ephemeral shared key are present in the key memory of the UICC already and only need to be called up from the key memory. In addition, the deterministic event can be provided to cover a variety of use cases and occasions, as will be set out in detail below. Also, a deterministic event allows to control to ensure a reduced SUCI calculation time in a controllable manner.

Instead of ECC public/private key pairs, alternatively non-ECC public/key pairs can be used. Instead of ECDH, DH can be used, i.e. non-ECC DH.

Accordingly, the presented method provides for a method for SUCI generation which has a reduced time span required for SUCI generation upon receipt of a GET IDENTITY command at the UICC, and which is applicable in a variety of use cases and occasions, and in a controllable manner.

Preferably, the services 124 and 125 according to [1] 3GPP 31.102 are available in the file EF_UST UICC and used in the SUCI calculation.

Particularly, the presented solution allows to use chip hardware with relatively low performance and/or low cost, and at the same time keep preset timeframes for SUCI calculation as preset in specifications.

The SUPI can be of IMSI type or of NAI type. For an IMSI type SUPI, the MSIN contained in the IMSI is encrypted, (other parts like MCC and MNC remaining unencrypted), and integrated as part of the SUCI. For an NAI type SUPI, the user name contained in the NAI is encrypted and integrated as part of the SUCI.

The ECIES key scheme according to [5] also comprises MAC generation, which is preferably also contained in the method according to the present invention.

Accordingly, the inventive method preferably further comprises the step: along with (3) derivation of the symmetric encryption key:

(3.1) generation of an initial counter block, ICB; or/and (3.2) generation of a Message Authentication Code, MAC, key; and in case of (3.2), (5) triggered by receipt of the GET IDENTITY command, generation of a Message Authentication Code, MAC, tag value with the MAC key.

According to some embodiments of the invention, in step (1.1), (1.2) multiple public/private key pairs or ECC public/private key pairs and Ephemeral shared keys are generated and stored to the key memory of the UICC.

According to the here-described embodiments, an inventory of multiple public/private key pairs or ECC public/private key pairs and Ephemeral shared keys is achieved, wherein the number of keys can be designed according to specific requirements and constraints of for example hardware and/or memory and/or processing capacities.

According to some embodiments, the deterministic event is established as:

consumption of a generated SUCI in an AUTHENTICATE command processed in the UICC subsequent to the SUCI generation.

With other words, when a SUCI was consumed, and thus pre-generated keys were consumed, fresh keys are pre-generated and stored, according to the inventive method, so the pre-generated keys are available when a next AUTHENTICATE command requiring a SUCI is to be processed.

According to some embodiments, the deterministic event is established as:

after an executed SUCI generation in the UICC, registering that one public/private key pair or ECC public/private key pair and Ephemeral shared key was consumed for generating the SUCI, the registered consumption of the public/private key pair or ECC public/private key pair and Ephemeral shared key acting as a trigger to generate a new public/private key pair or ECC public/private key pair and Ephemeral shared key and store the public/private key pair or ECC public/private key pair and Ephemeral shared key to the key memory.

According to some embodiments, wherein the deterministic event is established as:

presence of no or an insufficient number of public/private key pairs or ECC public/private key pairs and Ephemeral shared keys in the key memory.

According to some embodiments, a key status flag or key counter connected to the key memory is implemented in the UICC, indicating presence or absence of stored public/private key pairs or ECC public/private key pairs and Ephemeral shared keys, or a sufficient or insufficient number of stored public/private key pairs or ECC public/private key pairs and Ephemeral shared keys, in the key memory.

According to some embodiments, the UICC further comprises a watcher logic coupled to the key memory, the method further comprising the step:

by the watcher logic, monitor the key status flag or key counter;

wherein the deterministic event is established as the watcher logic detecting upon the monitored key status flag or key counter absence of, or absence of a sufficient number of, public/private key pairs or ECC public/private key pairs and Ephemeral shared keys.

According to some embodiments, an insufficient number of public/private key pairs or ECC public/private key pairs and Ephemeral shared keys in the key memory is a number below: twenty, ten, five, one, or some other intermediate value from twenty to one.

According to some embodiments, the deterministic event is established as:

loss of network coverage or connectivity in the 5G mobile communication network.

BRIEF DESCRIPTION OF THE DRAWINGS

Embodiments of the invention will now be described with reference to the accompanying drawings, throughout which like parts are referred to by like references, and in which represents.

DETAILED DESCRIPTION OF THE INVENTION

Figure 1:
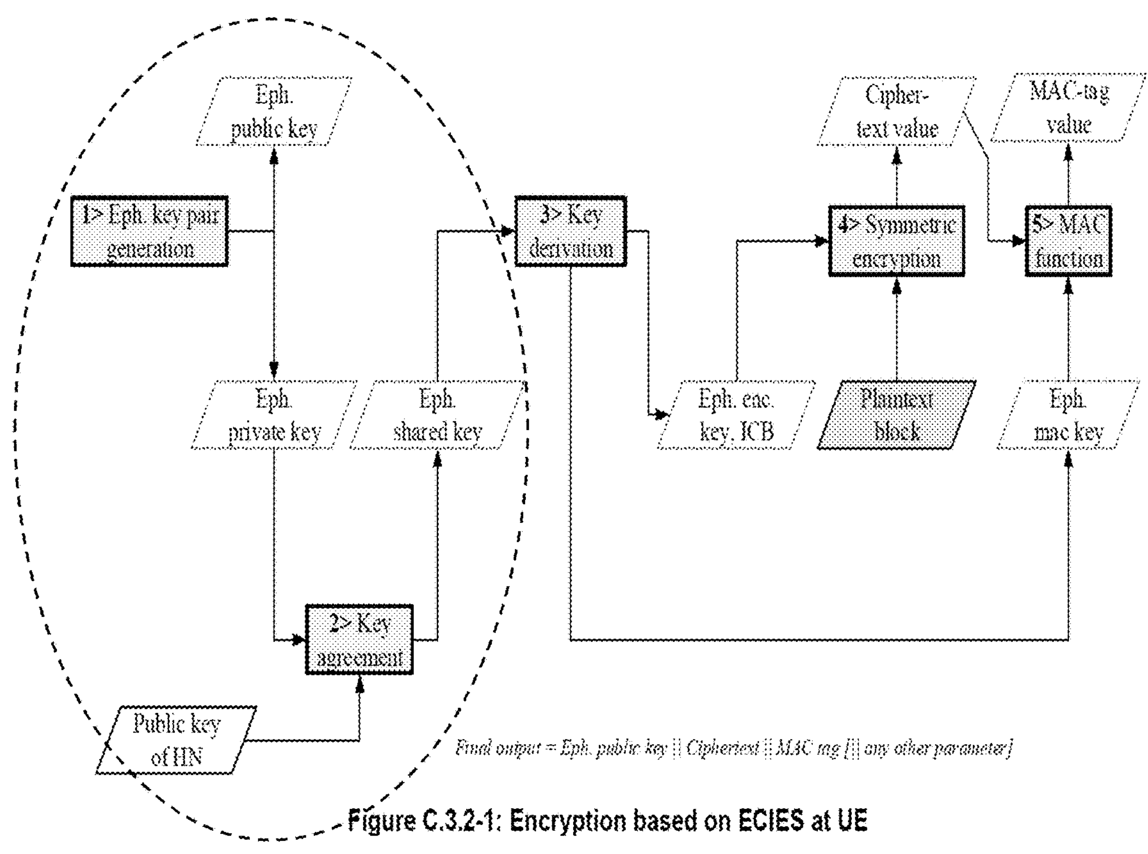
FIG. 1 shows the method of the ECC and ECDH key generation according [2] 3GPP 33.501, Annex C.3.2, with indication of steps triggered by a deterministic event, according to embodiments of the invention.

FIG. 1 shows the ECIES key scheme, comprising (ECC) public/private key pair generation and (ECDH) Ephemeral key generation according [2] 3GPP 33.501, Annex C.3.2, with a dashed circle around steps triggered by a deterministic event, according to embodiments of the invention. FIG. 1, except the dashed circle, corresponds to FIG. C.3.2-1 of document [2] 3GPP 33.501, Annex C.3.2. According to the prior art of [1] and [2], the steps of FIG. 1 (to FIG. C.3.2-1 of document [2] 3GPP 33.501) are triggered in that the UICC receives from the Mobile Equipment a GET IDENTITY APDU command. According to the present invention, the steps 1 and 2 which are surrounded by a dashed circular line are triggered by a deterministic event. Only the steps outside the circle are executed triggered by a GET IDENTITY APDU command. The steps triggered by the GET IDENTITY APDU command are step 3—key derivation of an encryption key for encrypting part of the SUPI, step 4—encryption of part of the SUPI to generate part of the SUCI, and step 5) generate a MAC key and generate a MAC value.

Figure 2:
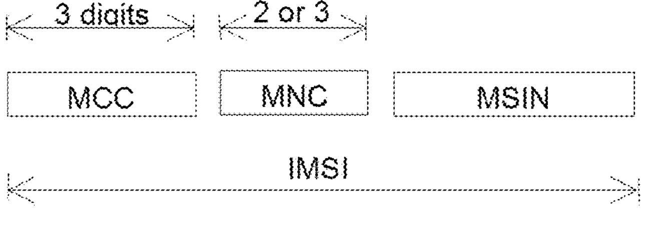
FIG. 2 shows the structure of IMSI according to [5] 3GPP 23.003, chapter 2.2.

FIG. 2 shows the structure of IMSI according to [5] 3GPP 23.003, chapter 2.2. IMSI comprises MCC, MNC and MSIN. Only MSIN is encrypted to generate SUPI. MCC and MNC remain unencrypted.

Figure 3:
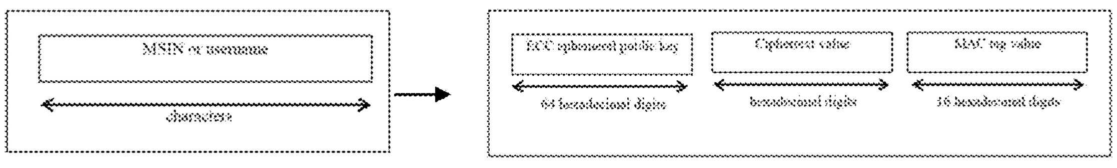
FIG. 3 shows the SUPI parts which are encrypted to generate SUPI, and the data set which is output by the ECIES key scheme which is used to generate SUIC, according to [5] 3GPP 23.003 2.2B.

FIG. 3 shows the SUPI parts which are encrypted to generate SUPI, namely MSIN for an IMSI type SUPI, and username for an NAI type SUPI.

FIG. 3 further shows the data set of three data elements which is output by the ECIES key scheme which is used to generate SUICI, according to [5] 3GPP 23.003 2.2B. With reference to FIG. 1, MSIN or username is input to step 4 as plaintext block for encryption with the symmetric encryption (key), to generate as output of step 4 the cyphertext value, which is shown in FIG. 3 as data element in the middle of the three data elements. With reference to FIG. 1, step 1, an ECC (ephemeral) public/private key pair is generated. The ECC (ephemeral) public key is also output from the ECIES key scheme, and is shown in FIG. 3 as the left data element of the three data elements. Further with reference to FIG. 1, from the cyphertext value and an (ephemeral) MAC key, with the MAC function of step 5, a MAC tag value is generated, and is also output as part of the ECIES scheme, and is shown in FIG. 3 as left data element of the three data elements output by the ECIES key scheme.

The invention claimed is:

1. A method for generating, in a universal integrated circuit card, UICC, a 5G subscriber concealed identifier, SUCI, for a 5G mobile communication network, the method comprising the steps executed in a processing entity comprised in the UICC:

(1) generation of a public/private key pair or an Elliptic Curve Cryptography, ECC, public/private key pair;

(2) Diffie Hellman, DH, or Elliptic Curve Diffie Hellman, ECDH, derivation of an Ephemeral shared key from the public/private key pair or ECC public/private key pair;

(3) derivation of a symmetric encryption key from the Ephemeral shared key;

(4) concealment of at least a part of a subscriber permanent identifier, SUPI, with the generated symmetric key to compute the SUCI, wherein steps (1), (2) being triggered by occurrence of a deterministic event at the UICC, the deterministic event occurring independently from receipt of a GET IDENTITY and/or & GET STATUS command at the UICC, and further comprising: storing the generated public/private key pair or ECC public/private key pair and Ephemeral shared key to a key memory provided in the UICC; and steps (3), (4) being triggered by receipt of the GET IDENTITY command at the UICC subsequent to steps (1), (2).

2. The method according to claim 1, further comprising the step:

along with (3) derivation of the symmetric encryption key:

(3.1) generation of an initial counter block, ICB; or/and (3.2) generation of a Message Authentication Code, MAC, key; and in case of (3.2), (5) triggered by receipt of the GET IDENTITY command, generation of a Message Authentication Code, MAC, tag value with the MAC key.

3. The method according to claim 1, wherein in step (1), (2) multiple public/private key pairs or ECC public/private key pairs and Ephemeral shared keys are generated and stored to the key memory of the UICC.

4. The method according to claim 1, wherein the deterministic event is established as:

consumption of a generated SUCI in an AUTHENTICATE command processed in the UICC subsequent to the SUCI generation.

5. The method according to claim 4, wherein a key status flag or key counter connected to the key memory is implemented in the UICC, indicating presence or absence of stored public/private key pairs or ECC public/private key pairs and Ephemeral shared keys, or a sufficient or insufficient number of stored public/private key pairs or ECC public/private key pairs and Ephemeral shared keys, in the key memory.

6. The method according to claim 5, wherein the UICC further comprises a watcher logic coupled to the key memory, the method further comprising the step:

by the watcher logic, monitor the key status flag or key counter;

wherein the deterministic event is established as the watcher logic detecting upon the monitored key status flag or key counter absence of, or absence of a sufficient number of, public/private key pairs or ECC public/private key pairs and Ephemeral shared keys.

7. The method according to claim 4, wherein an insufficient number of public/private key pairs or ECC public/private key pairs and Ephemeral shared keys in the key memory is a number below: twenty, ten, five, one, or some other intermediate value from twenty to one.

8. The method according to claim 1, wherein the deterministic event is established as:

after an executed SUCI generation in the UICC, registering a public/private key pair or ECC public/private key pair and Ephemeral shared key that was consumed for generating the SUCI, the registered consumption of the public/private key pair or ECC public/private key pair and Ephemeral shared key acting as a trigger to generate a new public/private key pair or ECC public/private key pair and Ephemeral shared key and store the new public/private key pair or ECC public/private key pair and Ephemeral shared key to the key memory.

9. The method according to claim 1, wherein the deterministic event is established as:

presence of no or an insufficient number of public/private key pairs or ECC public/private key pairs and Ephemeral shared keys in the key memory.

10. The method according to claim 1, wherein the deterministic event is established as:

loss of network coverage or connectivity in the 5G mobile communication network.

* * * * *